United States Patent [19]

Nilsson et al.

[11] Patent Number: 4,960,318

[45] Date of Patent: Oct. 2, 1990

[54] OPTICAL FIBER CABLE

[75] Inventors: Richard C. Nilsson, Hickory, N.C.; James M. Berry, Roanoke, Va.

[73] Assignee: Alcatel NA, Inc., Hickory, N.C.

[21] Appl. No.: 343,013

[22] Filed: Apr. 25, 1989

[51] Int. Cl.$^5$ .................................................. G02B 6/44
[52] U.S. Cl. ................................. 350/96.23; 350/96.10
[58] Field of Search ............... 350/96.23, 96.10, 96.15; 174/70 R

[56] References Cited

U.S. PATENT DOCUMENTS

| | | | |
|---|---|---|---|
| 4,038,489 | 7/1977 | Stenson et al. | 174/70 R |
| 4,195,468 | 4/1980 | King et al. | 57/9 |
| 4,199,224 | 4/1980 | Oestreich | 350/96.23 |
| 4,205,899 | 6/1980 | King et al. | 350/96.23 |
| 4,227,770 | 10/1980 | Gunn | 350/96.23 |
| 4,361,381 | 11/1982 | Williams | 350/96.24 |
| 4,388,800 | 6/1983 | Trezeguet et al. | 350/96.23 X |
| 4,389,088 | 6/1983 | Trezequet | 350/96.23 |
| 4,401,366 | 8/1983 | Hope | 350/96.23 |
| 4,474,426 | 10/1984 | Yataki | 350/96.23 |
| 4,491,386 | 1/1985 | Negishi et al. | 350/96.23 |
| 4,585,305 | 4/1986 | Chazelas et al. | 350/96.21 |
| 4,629,285 | 12/1986 | Carter et al. | 350/96.23 |
| 4,804,245 | 2/1989 | Katayose et al. | 350/96.23 |
| 4,830,457 | 5/1989 | Asada et al. | 350/96.23 X |

FOREIGN PATENT DOCUMENTS

| | | | |
|---|---|---|---|
| 63-197908 | 8/1988 | Japan | 350/96.23 X |
| WO88/10442 | 12/1988 | PCT Int'l Appl. | 350/96.23 X |

OTHER PUBLICATIONS

Product Brochure of Electro-Optical Products Div. of ITT describing open-channel optical cable, dated Jan. 1986.

Primary Examiner—Brian Healy
Attorney, Agent, or Firm—Peter C. Van Der Sluys

[57] ABSTRACT

An optical fiber cable contains a central strength member surrounded by a plurality of fiber-carrying guides traversing the length of the cable along reversing helical paths. A plurality of strength members are provided in lieu of selected symmetrically spaced guides. The strength members provide axial and torsional stability due to their reversing helical path. Periodic bandmarks are provided on each fiber for identification. An excessive length of fiber is provided in each guide to minimize fiber stress.

15 Claims, 2 Drawing Sheets

OPTICAL FIBER CABLE

BACKGROUND OF THE INVENTION

1. Field of the Invention

The present invention relates generally to the field of cables for optical fibers, and more particularly to an optical fiber cable designed for easy fiber access while maintaining fiber strength.

2. Description of the Prior Art

With the advent of local area networks and the relative broadband capabilities of fiber optic links, it has become commonplace for new communication systems to include fiber optic capabilities. In the use of optical fibers, it is important to provide physical protection for the fibers in view of the fragile nature of glass optical fibers. This is not to imply that optical fibers are not reliable over long periods of time, for such is not the case. Optical fibers, when properly protected, have excellent service lifetime. However, proper protection involves providing a cable which shields the fiber from physical stresses as well as extreme environmental conditions. The potential for optical fiber deterioration in wet environments is one example of the environmental conditions which must be avoided for reliable fiber service over extended periods of time.

A significant hazard to fiber service lifetime is stress, including tensile, compressive and torsional stresses. Optical fibers tend to develop microcracks when exposed to various stresses or short radius bends. Thus, it is desirable to provide a cable for the fibers which minimizes the stress and bending to which the fiber will be exposed. Microcracks eventually increase in size to the point where the crack interferes with optical transmission quality and causes diffusion of the light. Fibers having excessive interference are not suitable for broad bandwidth transmission and hence will have to be replaced by substitution of a spare fiber already in the cable or replacement of the entire cable.

In order to reduce fiber tension, it is common to provide a slight overlength of fiber in the cable so that as the cable is stretched the overlength is used to avoid tension on the fiber. The fiber is usually disposed loosely in the cable so that it can freely bend to absorb any cable compression without compressing the fiber. However, as mentioned above, microcracks also develop if the fiber is bent with too small a radius. Thus, care must be taken to provide just enough overlength to avoid fiber tension while avoiding too much overlength so that in cable compression the fiber is sharply bent so as to develop microcracks.

In local area network applications, each fiber must be tapped numerous times to extract and inject a light signal. It is not uncommon to require as many as 80 taps for each individual fiber. It is well known in the optical fiber art that each time a fiber is cut and re-spliced to effect a tap, significant attenuation of the optical signal is experienced at the splice. As the number of taps increase, the attenuation becomes unacceptable.

Accordingly, techniques have been developed to effect a tap without cutting or splicing the fiber, thereby eliminating the splice loss. An optical tapping technique commonly implemented requires bending the optical fiber until it has a radius of curvature which causes optical energy to exit from the core of the fiber being tapped and into the cladding layer where it can be directed to a coupler. Couplers of this type are well known and widely available from a variety of sources, such as RAYNET Corp. and are referred to as LID couplers, indicating that the couplers are intended for Local Injection and Detection (LID) of optical energy.

In cables having a plurality of fibers it has always proven difficult to identify one fiber from another. This difficulty is sometimes addressed by providing a color coding in the form of ink applied to the exterior of the optical fiber. This solution to the fiber identity problem created another difficulty in the use of fiber optic cables. Tapping the fiber using an LID coupler as described above requires that the glass core of the fiber be permitted to release some of the optical energy to the cladding from where it is directed to the coupler. The inking which was provided for fiber identity must be removed or it would block or reduce light transfer. Removal of the inking was accomplished by a quick acid etch. This worked well for removal of the ink, but has been found to be a cause of deterioration of the fiber at the location of the etch.

The deterioration of the fiber at the location of the etch caused a further complication to arise in fiber tapping arrangements as described above. Since the optical energy to be tapped must somehow be extracted from the fiber, it is necessary to cause the optical energy to be concentrated in the cladding, or at least to exit in part from the core, at the point where the tap is to occur. This is accomplished by introducing a sharp bend into the fiber at the tap location. The bend in the fiber, however, introduces stress into the fiber. This stress, in conjunction with the deterioration commenced as a result of the etch, has been found to be a source of fiber failure. Thus, the use of fiber inking for fiber identification has a significant drawback. These two detrimental conditions, the acid etch and the bending stresses, cooperate at the location of the fiber tap to deteriorate fiber quality.

As may be apparent from the above description of the fiber tapping technique commonly employed, there is a need for excess fiber length relative to the length of the cable. This extra length is needed in order to accommodate the introduction of a bend into the fiber for purposes to tapping the optical signal without cutting the cable. The extra length is usually provided by laying the fiber in the cable in a reverse helical manner. When fibers are laid in this manner the fiber can be unwound from a helical reversing point to provide the extra length.

Most optical fiber cables use radial strength components disposed between jacketing layers. This structure presents another problem when fibers within the cable must be accessed midway the cable. The first difficulty that is presented is that the strength members must be cut and removed over a finite length of the cable. This in itself is a time-consuming task. The second difficulty is that if the cable is under any stress, removal of the strength members will cause the stress to be transferred to the remaining components, including the fibers.

Providing a larger strength member at the center of the cable greatly increases the cable diameter which adds to its cost and is unsuitable, especially for local area network applications where a thin, unobtrusive cable is desired. Thus, providing easy fiber access while maintaining cable strength and minimal size is a difficult problem.

Even with the current level of understanding of the conflicting needs associated with optical cables, there has not previously been a cable design which provides ideal service in applications where multiple optical taps may be necessary. A comprehensive illustration of the prior art may be obtained by reference to the following U.S. Pat. Nos.: 4,038,489; 4,195,468; 4,227,770; 4,361,381; 4,389,088; 4,401,366; 4,585,305; and 4,804,245

SUMMARY OF THE INVENTION

The fiber optic cable of the present invention is particularly suitable for use in local area networks or other applications where it may be necessary to provide a large number of taps into one or more fibers without incurring a significant signal loss which would ordinarily accompany such a large number of fiber splices, and without incurring damage associated with severing strength members during fiber tap installation. The invention additionally relates to a manner of distinguishing one fiber from the others in a fiber optic cable.

It is an object of the present invention to provide a cable arrangement which reliably protects its optical fibers from both environmental deterioration and stress-related deterioration.

It is another object of the invention to provide a fiber optic cable wherein the optical fibers may be readily differentiated without inking the entire exterior surface of the fibers.

It is a further object of the invention to provide a fiber optic cable which is suitable for tapping of optical energy from any selected optical fiber without the need for optical fiber splices.

It is yet another object of the invention to provide a fiber optic cable which exhibits exceptional tensile strength and excellent flexural properties.

It is still another object of the invention to provide a fiber optic cable which can withstand severe compressive loading without suffering optical fiber damage.

These and other objects of the invention, which will become evident upon reading of the present description of the invention, are provided by an optical fiber cable according to the invention wherein a central strength member is surrounded by a plurality of symmetrically located fiber carrying guides. The fiber carrying guides preferably follow a reversing helical path in order to provide extra fiber length relative to the cable length and are sized to allow the fiber ample freedom of movement within the fiber carrying guide.

Strength members are provided in a symmetrical manner in lieu of some of the guides. In this manner, the strength members resist forces of the type which may be imposed on the fibers. As a result of the use of strength members in the same reversing helical pattern as the fiber channels, a high-strength cable may be provided which does not require layers of strength members radially outside of the optical fibers. Thus, the fibers may be accessed without the need to cut through any of the strength members.

The fibers are individually identified through the provision of marking bands spaced in an established manner along the length of the fibers. The bands are sufficiently separated to allow for optical tapping along the length of the fiber without the need to remove the identification bands.

DETAILED DESCRIPTION OF THE INVENTION

Figure 1:
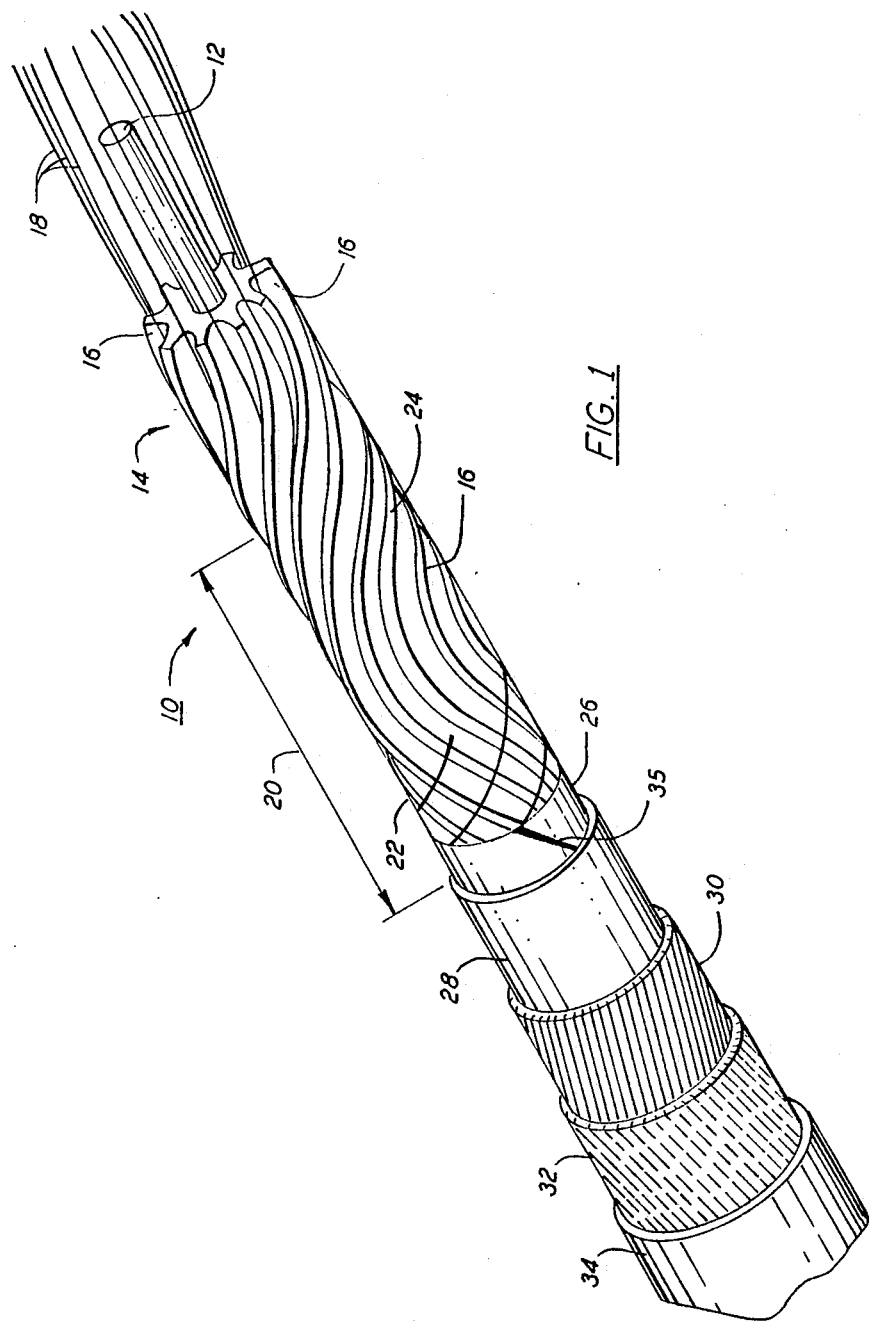
FIG. 1 is a broken perspective view, showing a first embodiment of the invention.

Referring to FIG. 1, there is shown an optical fiber cable 10 including a central strength member 12 of metallic or dielectric material surrounded by a profile member 14. The profile member 14 may be of a thermoplastic material which is extruded about the central member 12. In the preferred manner of extruding the member 14, a plurality of reversing helical grooves 16 are introduced into the exterior surface of the member 14. These grooves 16 provide protective guides for optical fibers 18 which lay in the guides in a stress-free state. The grooves are reversing helical grooves with the helix reversing direction periodically, as at 20.

The oscillating helices of the grooves have a pitch and a reversing period which insures that there will be sufficient fiber length relative to cable length to allow for connection of the fiber to an LID coupler as described heretofore. The fiber must be accessed at a reversal point 20 and lifted from the grooves 16 over a predetermined cable length to provide the necessary fiber length for connection to the coupler. If the pitch and reversing period are too long, an excessive length of cable jacket must be stripped off to access the fiber. A preferred distance between reversing points is no more than 300 mm cable length so that the cable jacket need only be stripped over a length of one-half to one meter. A preferred pitch for the helical grooves would range from 75 mm to 125 mm and would produce a groove length at least 101 percent of the longitudinal cable length. The number of revolutions between reversal points can range from one to four. The minimum pitch is dictated by the radius of the helical path of the grooves and the minimum bend radius that a fiber can withstand without deterioration, which is usually about 50 mm.

FIG. 1 also illustrates a core binder 22 which is helically wrapped about the profile member 14 with a pitch which insures that the optical fibers will remain in the grooves 16 under extreme bending torsional conditions.

The grooves 16 may be filled with a moisture-resistant gel, as at 24, to improve the cable's resistance to water ingression. A Mylar tape 26 may also be applied about the profile member 14 and over the core binder 22. The Mylar tape may be helically wrapped, or longitudinally applied and wrapped with a helically applied binder 35. A thermoplastic inner jacket 28 may be extruded over the helically-wrapped tape 26 in order to completely enclose the grooves.

If desired for additional strength, contrahelically-applied radial strength components 30 and 32 may then be provided to add strength while retaining flexibility. The strength components are preferably a fabric material such as Kevlar. An outer jacket 34 may then be extruded to provide an environmental protective layer and to provide a visually attractive cable. For specific applications, it may be desirable to provide an armored jacket for rodent protection.

While the above described cable may be functional for applications calling for frequent optical tapping, there is room for improving the ease with which a selected fiber may be accessed for tapping requirements.

Initially, the number of layers of various materials included in the cable described above results in a rather complicated procedure for opening up the cable to expose the fibers. In addition to the various plastic layers, there are numerous strength components which must be compromised in order to expose the fiber. This disadvantage of such cable designs can be overcome by provision of the strength members which are provided in place of two or more of the grooves 16.

Figure 2:
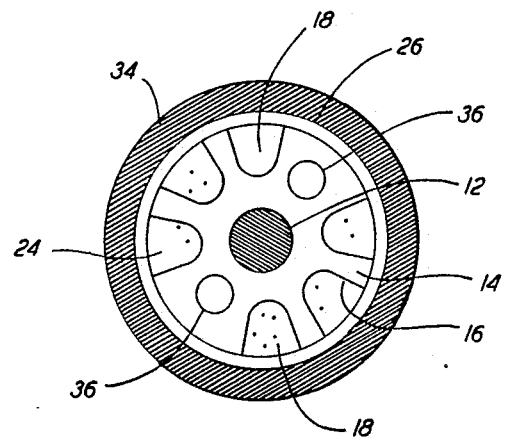
FIG. 2 is a cross-section showing another embodiment of the invention.

FIG. 2 illustrates an embodiment wherein strength members 36 are provided on opposed sides of the central strength member 12 and are embedded in the plastic profile member 14. The strength members 36 are symmetrically spaced about the central strength member 12 and lie in positions that would have been occupied by grooves 16. The reversing helical path traversed by the grooves 16 along the length of the cable is also followed by the strength members 36. Because the grooves for the strength members and fibers follow the same reversing helical paths, the strength members 36 provide support in generally the same directions as the directions in which the fibers lay along the length of the cable. The strength members 36 may be of steel, dielectric, plastic, aramid fibers or any other material having good strength characteristics when exposed to tension (and preferably both compression and tension). It is additionally desired that the strength members 36 will exhibit good resistance to torsion forces, since the reversing helical arrangement for the strength members aids in the cable's resistance to torsion forces.

This variation in cable design, combined with the provision of a central strength member 12 eliminates the need for the contrahelically-applied radial strength components 30 and 32 and one of the jackets such as 28.

Since the fiber-guiding grooves 16 are helically oriented about the cable, it is not possible to select a particular groove with any degree of certainty at a randomly-selected location along the length of the cable. This is primarily due to the fact that the reversing helical grooves can rotate the fiber to any portion of the cable. Moreover, there is the likelihood that more than one fiber will be placed within each groove. Thus, it is necessary to provide a distinctive identification technique for positively identifying the desired fiber at any point along the length of the cable. This will allow the cable to be opened up at any point along the length of the cable without losing the ability to positively locate the desired fiber, and without losing the ability to couple light out of the fiber.

A fiber marking technique has been conceived which is compatible with all of the conflicting demands imposed on fibers within a fiber optic cable. The marking technique permits the fiber to be optically tapped without requiring the etching of the colored ink. Additionally, through the careful selection of marking patterns, it is possible to individually discriminate among a large number of optical fibers with complete reliability.

According to the preferred marking technique, a distinct band pattern of rings, either narrow, broad, or a combination of both, is placed about each fiber in the cable. The band pattern is repeated periodically along the length of the fiber and hence the cable. The period, or distance, between repetitions depends on the particular cable being employed and the type of tapping technique which will be employed. In any tapping technique, there is a minimum length of cable which must be opened up in order to expose enough fiber for the tapping operation. It is desirable that the band marking of the fibers have a period which insures that there is one full band pattern exposed when the cable is opened up in an optimum amount. Thus, the band pattern must be repeated at least once along each length of cable equal to the length of the opening for tapping.

While it will be feasible to provide the band marking with any permanent marking technique, it is preferred to provide the marking on the fiber using ink prior to the cabling operation. A plurality of spools of differently marked fiber will be used in the cabling line.

A color and spacing code has been developed for the band patterns. In the preferred implementation of the coding, a combination of color, spacing and width of the bands is employed for discrete fiber identification. In this regard, the patterns are formed of combinations of narrow and wide colored rings. The narrow rings are generally about 1 mm wide, and the wide rings are about 3 mm wide. The spacing between the rings can also be varied. Each band pattern has its width determined according to a discrete pattern for that individual fiber; however, it is desirable to limit the band pattern width to a maximum of 10 mm. It is preferred to employ only one color per fiber, thus placing greater emphasis on the control of the ring width, number of rings, and the spacing between rings within an individual band pattern.

Figure 3:
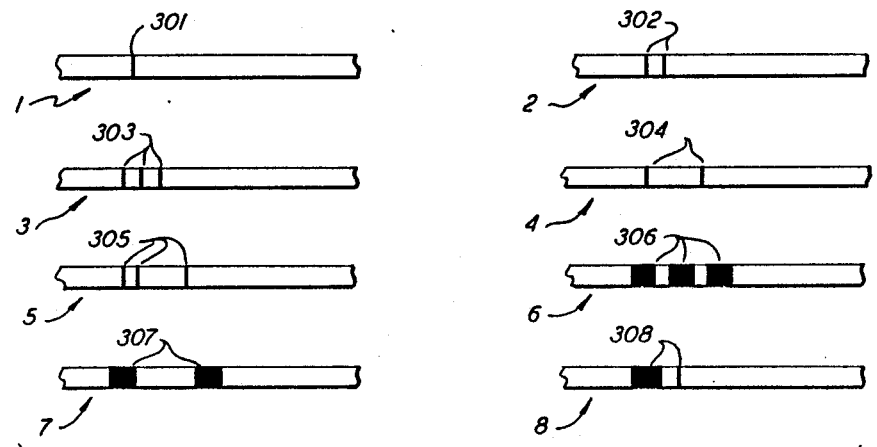
FIG. 3 illustrates a series of optical fibers having band markings in accordance with the invention.

FIG. 3 illustrates eight fibers, each having a discrete coding band based on the use of a single color for all eight fibers in the group. The first fiber 1 employs a single ring 301. The second fiber 2 has two rings 302 and the third fiber 3 includes three rings 303. Minimum ring spacing of about 2 mm is employed between the rings on fibers 2 and 3. Fiber 4 employs two rings 304 with maximum ring spacing of about 4 mm to distinguish this band pattern from the band pattern of fiber 2. Fiber 5 employs a three-ring band pattern 305 having min:max spacing between first:second and second:third rings. Each of fibers 1 through 5 has employed band patterns employing narrow rings. Fiber 6 employs three wide rings 306 with minimum spacing, while fiber 7 employs wide rings 307 with maximum spacing. Finally, fiber 8 employs two rings 308, one being a wide ring and the other being a narrow ring.

As is now evident, there are numerous discrete band patterns available for the individual fibers within a cable, even if the band patterns all employ the same color for the fiber marking. Of course, there is no need to limit all fibers within a cable to markings employing the same color. Up to ten different colors are available. In any event, there is ample opportunity to provide discrete fiber band patterns for a large number of fibers within a cable.

If the band patterns are separated by 20 mm or more, but preferably less than 100 mm, it will be easy to open the cable at substantially any point along the cable length and provide for optical coupling without being inconvenienced by the fiber markings. Each of the band patterns should be kept to a maximum length of about 10 mm. In the preferred implementation of these band patterns, the spacing between band patterns is slightly greater than the length of fiber needed for the optical coupling, and the length of the band patterns is as short as feasible. This results in the greatest number of band patterns per unit length of cable and maximizes the recognizability of the discrete fiber being sought. Using the preferred optical coupling, a 20-30 mm separation of band patterns is optimal, with band patterns about 10 mm wide.

Another aspect of the invention relates to the prevention of stress on fibers within the cable. Prevention or reduction of stress on the fibers contributes to fiber lifetime, as explained above. By providing a slightly excessive fiber length relative to the length of the shortest path the fiber could take through the cable, the fiber will experience minimum stress. In an open-channel fiber having helical grooves in which the fiber is disposed, the shortest path would be along the bottom of a groove. Satisfying the 'excessive length' requirement may easily be accomplished in open-channel cables by simply laying the fiber in the groove at a position about halfway into the groove. By doing this, the fiber follows a slightly longer path than necessary. This technique allows for the expansion and compression of the cable. Ideally, the fiber length should be at least 101 percent of the longitudinal length of the cable. When tension is on the cable and it expands, stress will not be on the fiber. When the cable is compressed, the fiber has room to move without bunching up and bending, which would produce microcracks.

The foregoing description of the invention illustrates the manner in which a fiber optic cable may be employed in applications where the cable may have to be frequently handled, may have to be repeatedly tapped, and may still provide ready identification of the individual fibers within the cable. It is significant that this cable does not required radially-wrapped strength members, but rather may rely on the placement of strength members in place of two or more symmetrically located fiber grooves. This obviates the need to cut through the strength members during fiber tapping and eliminates risks associated with excessive stressing of the fibers when strength members are severed. In the present cable design, the strength members are not severed during optical tapping.

The above description has been limited to an embodiment of an open-channel cable for the sake of brevity; however, the principles of the invention are equally applicable to a loose-tube cable. In such an embodiment the buffer tubes would be reverse helically laid around a central strength member. A number of buffer tubes could be replaced by strength members if required. The fibers would be band marked as described, and the fibers would be provided with overlength by placing them in the center of the buffer tubes prior to helical wrapping of the buffer tubes. Essentially all the advantages of the invention can be realized except for the exceptional ease of fiber access provided with open-channel cable. Preferably in a loose-tube cable the buffer tube should be marked to indicate which fibers are in the buffer tube. In the case of marking the buffer tube, spacing is not an object, since the light need not pass through the buffer tube. The marking should, however, be close enough so that the proper buffer tube can be identified within the cable length over which the jacketing is removed.

While the present invention has been described with respect to a particular manner of implementing the invention, it is to be understood that the foregoing description is intended to inform and not to limit. The invention resides in the innovations described herein and in all present and future manners of implementing these innovations. The following claims are to be understood to encompass all manner of practicing the invention which are or which become evident in view of the relevant technology as it exists now and as it develops.

What is claimed is:

1. An optical fiber cable, comprising:
    a central strength member located generally along a longitudinal axis of said cable;
    a plurality of optical fibers disposed in a plurality of fiber guides traversing the length of said cable along reversing helical paths surrounding said central strength member;
    strength members symmetrically positioned about the central strength member and traversing the length of said cable along reversing helical paths located in juxtaposition with and between selected ones of the paths of the fiber guides; and
    a jacketing means for enclosing said cable.
2. An optical fiber cable as claimed in claim 1, wherein said cable further comprises:
    a profile member surrounding said central strength member, said profile member having a plurality of reversing helical grooves formed on the outer surface of said profile member, said grooves functioning as said fiber guides and said strength members being embedded in said profile member adjacent said grooves.
3. An optical fiber cable as claimed in claim 1, wherein said fiber guides comprise buffer tubes helically wrapped about the central strength member, and said strength members are provided in place of two or more buffer tubes.
4. An optical fiber cable as claimed in claim 1, wherein said strength members are dielectric.
5. An optical fiber cable as claimed in claim 1, wherein said strength members are metallic.
6. An optical fiber cable as described in claim 1, wherein the helical paths of the fiber guides have a preferred pitch in the range of 75 mm to 125 mm.
7. An optical fiber cable as described in claim 1, wherein the number of revolutions of the helical paths of the fiber guides range from one to four between reversal points.
8. An optical fiber cable as described in claim 1, wherein the helical paths reverse direction at a distance of no more than 300 mm.
9. An optical fiber cable employing a plurality of optical fibers laying generally longitudinally along the length of said cable, the improvement comprising:
    band marking on said fibers for providing positive distinguishing markings on each said fiber, said band marking repetitively placed along the length of said fibers at intervals greater than 20 mm and less than 100 mm.
10. An optical fiber cable as claimed in claim 9, wherein said band marking comprises inked ring patterns.
11. An optical fiber cable as claimed in claim 10, wherein said inked ring patterns for each fiber are of a single color for such fiber.
12. A optical fiber cable as claimed in claim 9, wherein the band markings comprise patterns having a maximum length of approximately 10 mm.
13. An optical fiber cable of the type employing a central strength member and a plurality of optical fiber guides traversing the length of said cable along reversing helical paths, surrounding said central strength member, said fiber guides having a cross section with a predetermined depth, the improvement comprising:
    optical fibers disposed in said optical fiber guides, said fibers having a length through said guides equal to at least 101 percent of the longitudinal cable length.
14. An optical fiber cable as described in claim 13, wherein the fibers are disposed halfway into the depth of said guides.

15. An optical fiber cable particularly adapted for use with local injection and detection couplers which require a predetermined length of uncoated fiber for injecting and detected light traveling in said fiber, said cable employing a plurality of optical fibers laying generally longitudinally along the length of said cable, the improvement comprising:

band marking on said fibers for providing positive distinguishing markings on each said fiber, said band marking repetitively placed along the length of the fibers at intervals equal to or greater than the the predetermined length of uncoated fiber needed for the coupler.

* * * * *